(12) United States Patent
Hintzen et al.

(10) Patent No.: US 6,744,855 B1
(45) Date of Patent: Jun. 1, 2004

(54) SERVICE CONTROL PLATFORM

(75) Inventors: Heinrich Hintzen, Stuttgart (DE); Wolfgang Lautenschlager, Weissach-Flacht (DE)

(73) Assignee: Alcatel, Paris (FR)

( * ) Notice: Subject to any disclaimer, the term of this patent is extended or adjusted under 35 U.S.C. 154(b) by 749 days.

(21) Appl. No.: 09/594,773

(22) Filed: Jun. 16, 2000

(30) Foreign Application Priority Data

Jun. 18, 1999 (DE) .......................... 199 28 017

(51) Int. Cl.$^7$ .......................... H04M 3/22; H04M 7/00
(52) U.S. Cl. ................ 379/32.01; 379/32.04; 379/221.08
(58) Field of Search ................ 379/207.02, 221.08, 379/35

(56) References Cited

U.S. PATENT DOCUMENTS

| | | | | |
|---|---|---|---|---|
| 5,923,744 | A | * | 7/1999 | Cheng .................. 379/221.09 |
| 6,229,887 | B1 | * | 5/2001 | Albers et al. ............... 379/219 |
| 6,504,907 | B1 | * | 1/2003 | Farris et al. ................. 379/35 |

* cited by examiner

*Primary Examiner*—Ahmad F. Matar
*Assistant Examiner*—Hector Agdeppa
(74) *Attorney, Agent, or Firm*—Sughrue Mion, PLLC

(57) ABSTRACT

The invention relates to a method of intercepting calls between two or more subscribers (A, B) of a communications networks (KOM) and to an interception manager and a service control platform for supporting the implementation of the method. For each of the calls, at least one of a plurality of service control points (SCP1 to SCP3) can be triggered by a service switching point (SSP1 to SSP3). The communications traffic between service switching points (SSP1 to SSP3) of the communications network and the service control points (SCP1 to SCP3) is routed through an interception manager (LIM) which is central to all service control points. The central interception manager (LIM) is triggered for a call when one (SCP1) of the service control points (SCP1 to SCP3) is triggered for this call by one (SSP1) of the service switching points (SSP1 to SSP3). When triggered for a call, the central interception manager (LIM) monitors the communications traffic between the respective service switching point (SSP1) and the respective service control point (SCP1) for the respective call and, based on information exchanged between the service switching point (SSP1) and the respective service control point (SCP1) and on predefined filter criteria, determines whether the call should be intercepted or not.

10 Claims, 3 Drawing Sheets

SERVICE CONTROL PLATFORM

BACKGROUND OF THE INVENTION

This invention relates to a method of intercepting calls between two or more subscribers of a communications network to an interception manager for supporting the interception of calls between two or more subscribers of a communications network and to a service control platform for controlling services for calls in a communications network, comprising a plurality of service control points which control the provision of a service for a call when triggered for the call by a service switching point of the communications network.

National and international laws require operators of a communications network to provide mechanisms within the communications network which enable authorities (police, secret services, . . . ) to monitor telephone conversations of suspicious persons.

The invention starts from the way this problem is solved in a classical telephone network:

In the local exchange of the subscriber to be monitored, the subscriber record of the subscriber is marked, and a sort of conference connection to the authority is established. The data to be additionally determined for the respective intercepting operation are determined in the exchange by accessing the authority database, which forms part of the exchange. The entire interception mechanism is thus part of the exchange.

These existing mechanisms encounter fundamental difficulties if in a communications network, services are provided for calls using the IN architecture (IN=intelligent network): For such calls, it is usually impossible to say in advance through which exchanges and to which terminals (translation) a call will be routed.

SUMMARY OF THE INVENTION

It is the object of the invention to permit correct initiation of the monitoring for those calls for which an IN service is provided.

This object is attained by a method of intercepting calls between two or more subscribers of a communications network wherein for each of the calls, at least one of a plurality of service control points can be triggered by a service switching point of the communications network, and wherein the service control points, when triggered for a call, control the provision of a service for the call, the method further characterized in that the communications traffic between service switching points of the communications network and the service control points is routed through an interception manager central to all service control points, that the central interception manager is triggered for a call when one of the service control points is triggered for this call by one of the service switching points, that the central interception manager, when triggered for a call, monitors the communications traffic between the respective service switching point and the respective service control point for the respective call and, based on information exchanged between the respective service switching point and the respective service control point and on predefined filter criteria, determines whether the call should be intercepted or not, and that the central interception manager initiates the interception of the respective call if it determines that the call should be intercepted.

The object of the invention is further attained by an interception manager for supporting the interception of calls between two or more subscribers of a communications network, wherein the interception manager comprises a communications control unit for communication with service switching points of the communications network and for communication with a plurality of service control points which each control the provision of one service for a call when triggered for one of the calls by one of the service switching points, wherein the interception manager further comprises a control unit designed to centrally trigger the interception manager for a call when one of the service control points is triggered for this call by one of the service switching points, the interception manager further comprises at least one interception logic designed to monitor the communications traffic between the respective service switching point and the respective service control point for a call when the interception manager is triggered for this call, and to determine on the basis of the information exchanged between the service switching point and the respective service control point and on the basis of predefined filter criteria whether the call should be intercepted or not, and wherein the control unit is further designed to initiate the interception of the respective call when the at least one interception logic determines that the call should be intercepted.

Finally, the object of the invention is further attained by a service control platform for controlling services for calls in a communications network , comprising a plurality of service control points which control the provision of a service for a call when triggered for the call by a service switching point of the communications network, wherein the service control platform further comprises a central interception manager for all service control points, which is connected to the one or more service control points, the interception manager comprises a communications control unit for handling and controlling the communications traffic with service switching points of the communications network and with the service control points, the interception manager further comprises a control unit designed to centrally trigger the interception manager for a call when one of the service control points is triggered for this call by one of the service switching points, the interception manager further comprises at least one interception logic designed to monitor the communications traffic between the respective service switching point and the respective service control point for a call when the interception manager is triggered for this call, and to determine on the basis of the information exchanged between the service switching point and the respective service control point and on the basis of predefined filter criteria whether the call should be intercepted or not, and wherein the control unit is further designed to initiate the interception of the respective call when the at least one interception logic determines that the call should be intercepted.

The invention is based on the idea that a service central to all IN services is tied into the communication between the service switching points (SSPs) and the service control points (SCPs). By monitoring the signaling communication between the service switching points and the service control points, this central service determines for all IN services provided by the service control points whether the monitoring of a call is to be initiated or not. Thus, between service switching points and service control points, an intermediate layer with a function central to all service control points, an "interception manager", is introduced which decides on the initiation of the monitoring of those calls for which one or more IN services are provided.

This concept is advantageous in that correct initiation of the monitoring is made possible for calls for which an IN service is provided.

Another advantage is that the IN service logic need not be altered, so that the software of the service control points need not be modified. This considerably expedites and facilitates the creation and changing of a monitoring function, particularly if a large number of IN services are available for the communications networks:

Only a central creation/change is necessary to initiate the monitoring for a large number of IN services. If the monitoring function were integrated directly into the service control point assigned to an IN service, a creation/change of the monitoring function would have to be performed for each individual IN service, taking into account the respective service-specific functions. Accordingly, the invention is particularly suited for communications systems in which a large number of IN services are available.

A further advantage is that the service control points are not involved in the initiation of the monitoring. In the service control points, there is no information of any sort which shows that monitoring of specific subscribers is intended or currently initiated, nor is such monitoring recognizable by the service control points in any other manner. This has the advantage that this classified information is present only at a central location, namely in the interception manager. Such a central interception manager is much easier to protect than a large number of possibly spatially distributed service control points. Therefore, the solution according to the invention is also very advantageous from a security point of view. Another important aspect in this connection is that service control points and the services provided by them can also be operated by arbitrary, private service providers, which further increases the security risk.

Further advantageous aspects of the invention are defined in the subclaims.

BRIEF DESCRIPTION OF THE DRAWINGS

The invention will become more apparent by reference to the following description of several embodiments of the invention taken in conjunction with the accompanying drawings, in which:

FIG. 1 shows a communications network KOM, an interception manager LIM, and three service control points SCP1 to SCP3.

DETAILED DESCRIPTION OF THE INVENTION

The communications network KOM is a conventional telephone network. However, it may also serve to transmit data or video signals, and it may also consist of different, interconnected subnetworks that are associated with different network operators, for example. Such subnetworks may also be formed by mobile radio networks.

Figure 1:
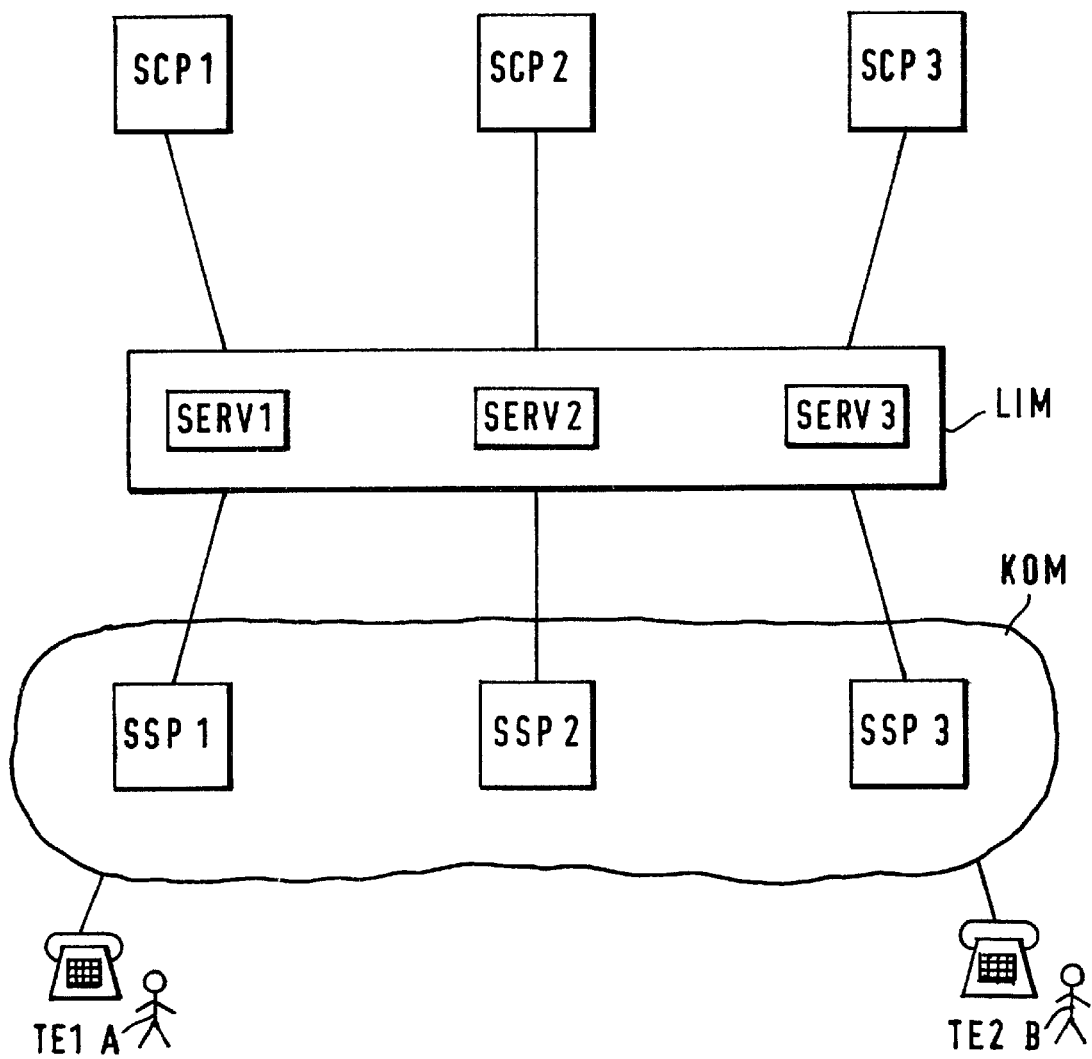
FIG. 1 is a block diagram of a communications system with an interception manager according to the invention.

The communications network KOM is formed by a plurality of interconnected switching centers, of which three specifically designed switching centers, namely three service switching points SSP1 to SSP3, are shown in FIG. 1 by way of example. The service switching points SSP1 to SSP3 are preferably service switching points according to the IN architecture. The number of service switching points SSP1 to SSP3 has been chosen by way of example, but at least one such switching point must be present in the communications network KOM. The service switching points SSP1 to SSP3 are connected to the interception manager LIM by the signaling network of the communications network KOM, for instance by a No. 7 signaling network. Instead of the signaling network, a broadband data network, such as an ATM, DQDB, or IP network (ATM=Asynchronous Transfer Mode, DQDB=distributed-queue dual-bus, IP=Internet Protocol) may be used for these connections.

In the controls of the service switching points SSP1 to SSP3, service switching functions are implemented. The service switching functions detect particular trigger events during the establishment of a call that is set up through the respective service switching point. Such trigger events may for instance be particular called numbers (call destination) or particular characteristics of the calling and called subscribers (call origin). When such an event is detected by a service switching function, the latter generates a service request message. This service request message is directed via the interception manager LIM to one (or more) of service control points SCP1 to SCP3 which provides the service(s) associated with the respective trigger event. In the subsequent dialog (service interaction) between the service switching function and the service control point, which is also conducted via the interception manager LIM, the service switching function then executes the instructions directed to it, which relate to the further processing of the call. Such instructions may, for instance, include an instruction to forward the call to another number.

It is also possible that the service switching points SSP1 to SSP3 trigger one of the service control points for each call routed through it. One example is a service control point that provides a number portability service. This service control point may be triggered for each call if this service must be provided for all calls.

It is also possible to trigger two or more service control points for one call. That will be the case if two or more different services are to be provided for one call.

Service control points SCP1 to SCP3 preferably correspond to service control points according to the IN architecture. One or more of service control points SCP1 to SCP3 may also be formed by a virtual machine which, together with other functions, is executed on a hardware platform. Service control points SCP1 to SCP3 each comprise a service logic. Each of the service logics represents a service control program that describes the control of the provision of a specific service. Activation of a service logic for a call starts a process which executes the respective control program for this call.

Interception manager LIM is connected to service control points SCP1 to SCP3 by a communications network. This communications network is preferably the signaling network of communications network KOM, but it may also be any other data network, such as an IP network. Different service control points may also be connected to interception manager LIM by different communications networks.

It is also possible that one or more of service control points SCP1 to SCP3 are associated with a different service provider or network operator. Such service control points are then connected to interception manager LIM via a gateway that provides the necessary network interworking functions between the service control points and other service providers or network operators, such as screening functions. Such service control points are often connected to the interception manager by a different communication medium than the other service control points, e.g., by an SS No. 7 instead of a local area network (LAN).

Interception manager LIM is formed by one or more computer platforms which are interconnected by a communication medium and on which reside applications for performing its functions. In the embodiment shown in FIG. 1, interception manager LIM has three computer platforms SERV1 to SERV3. Interception manager LIM may also represent a virtual machine which runs on one or more interconnected servers that form the hardware platform for the interception manager and perform further, IN-related functions. Such further functions are advantageously IN infrastructure services, such as number portability functions, and INAP adaptation functions. The interception manager would thus form part of the "lower layer IN" level in an IN architecture concept that divides IN services into a "lower layer IN" level and an "upper layer IN" level.

The communications traffic between service switching points SSP1 to SSP3 of communications network KOM and service control points SCP1 to SCP3 is routed through the central interception manager LIM. Interception manager LIM provides a central service for all service control points SCP1 to SCP3: It is triggered for a call between subscribers of communications network KOM when one of service control points SCP1 to SCP3 is triggered for this call by one of service switching points SSP1 to SSP3. When the central interception manager LIM has been triggered for a call, it monitors the associated service interaction between the respective service switching point and the respective one or more service control points. Based on the information so obtained and on predefined filter criteria, interception manager LIM then determines whether the associated call should be intercepted or not. If the call should be intercepted, interception manager LIM initiates its interception.

The detailed structure of interception manager LIM will now be described with reference to FIG. 2.

Figure 2:
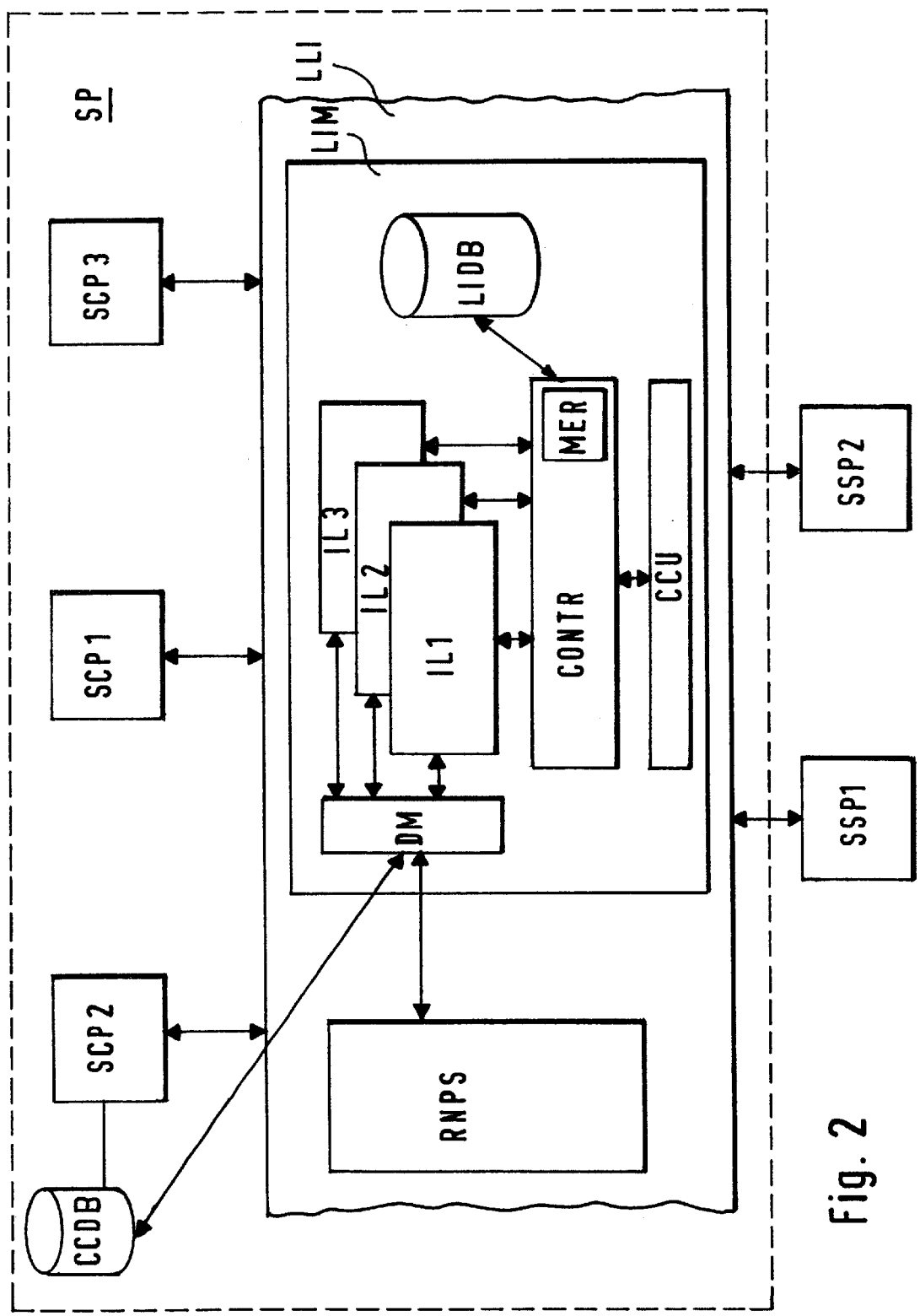
FIG. 2, is a functional diagram of the interception manager of FIG. 1 and its incorporation in the communications system of FIG. 1.

FIG. 2 shows service control points SCP1 to SCP3, service switching points SSP1 and SSP2, interception manager LIM, a number portability function RNPS, and a database CCDB.

Service control points SCP1 to SCP3, interception manager LIM, and number portability function RNPS together form a service control platform SP. Service control platform SP serves to control services that are provided for calls between subscribers of communications network KOM. Interception manager LIM and number portability function RNPS form part of an infrastructure IN platform LLI. Infrastructure IN platform LLI provides the functions of the "lower layer IN" level and decouples service switching points SSP1 to SSP3 from service control points SCP1 to SCP3.

Interception manager LIM represents an interception manager central to all service control points SCP1 to SCP3 within service control platform SP. Interception manager LIM is formed by application programs that are executed on the computer platform of infrastructure IN platform LLI. From a functional point of view, interception manager LIM contains two communications control units CCU and DM, a control unit CONTR, several interception logics IL1 ro IL3, and an authority database CCDB.

Communications control unit CCU handles and controls the communications traffic with service switching points SSP1 to SSP3 of communications network KOM and with service control points SCP1 to SCP3. It thus performs functions that permit the reception and interpretation of the messages exchanged between service switching points SSP1 to SSP3 and service control points SCP1 to SCP3. These functions comprise functions for processing the transport protocols used, for instance the transport protocols of Signaling System No. 7. Residing above these functions are functions that process the TCAP protocol of ITU-T Signaling System No. 7 and the overlying INAP (TCAP= Transaction Capabilities Application Part, INAP=Intelligent Network Applications Protocol), through which service switching functions and service control functions interact in accordance with the IN architecture. The IN application messages (INAP messages) exchanged according to this protocol and the basic services and actions of this protocol are explained by means of an example in ITU-T Recommendation Q.1219, Chapter 6.5, pages 26 to 40, "Intelligent Network Applications Protocol", and, in more detail, in ITU-T Recommendation Q.1219 for IN CS-1.

Communications control unit DM allows interception manager LIM to communicate with databases that are associated with service control points or are contacted by the latter for the provision of services. Communications unit DM thus perform functions that enable access to and interaction with such databases. These functions comprise functions for processing transport protocols, preferably protocols used for communication in local area networks, such as Ethernet, Fast-Ethernet, FDDI, or token protocols. Arranged above these functions are, for example, functions for processing the IP protocol and the TCP or UDP protocol (IP=Internet Protocol, TCP=Transmission Control Protocol, UDP=User Datagram Protocol) as well as other higher-level protocols. The TCP or UDP protocol can be replaced by other transport protocols if the underlying transport protocols are not the protocols of the No. 7 protocol stack.

Control unit CONTR monitors the communications traffic between service switching points SSP1 to SSP3 and service control points SCP1 to SCP3, which is routed through interception manager LIM, by means of communications control unit CCU. By evaluating the service request messages sent from the service switching points to service control points, interception manager LIM detects when one of service control points SCP1 to SCP3 is triggered for a call by a service switching point. When control unit CONTR detects such an event, it triggers interception manager LIM for this call by generating a process in which interception logics IL1 to IL3 are instantiated for this call. A copy of the messages that are exchanged for this call between the service switching point and the service control point is forwarded by the control unit CONTR to this process, which performs the function of interception logics IL1 to IL3 for this call. The process sends a message to control unit CONTR when it determines that this call should be intercepted. When the service interaction between the service switching point and the service control point is terminated for this call, the associated process is terminated by the control unit. Control unit CONTR thus manages a number of such parallel processes equal to the number of parallel service interactions between service switching points SSP1 to SSP3 and service control points SCP1 to SCP3.

If one of interception logics IL1 to IL3 determines that a call should be intercepted, control unit CONTR will initiate the interception of this call. To do this, it sends a signaling message to the respective associated switching point which indicates to the latter that the call should be intercepted. In another embodiment, control unit CONTR sets a specific parameter in a signaling message sent by the associated control service control point to the associated service switching point, thus indicating to the latter that the call should be intercepted.

The service switching point then establishes a specific conference connection (only monitoring) to an authority, over which the latter can monitor the call.

Advantageously, in addition to the mere information that the call should be intercepted, further data are determined by control unit CONTR and sent to the associated service switching point. These data are then forwarded by the service switching point to the respective authority.

Additional information that is routed from interception logics IL1 to IL3 to control unit CONTR enables interception manager LIM to access authority database LIDB. Such additional information includes, for example, information on the authority for which an interception is to be performed and the case to which the interception relates. By accessing the authority database, the respective authority data are determined for the call to be intercepted. Authority data are information about the call to be intercepted, such as time, called/calling number, services provided for the call, call duration, etc., as well as identification of the authority and the case for which the interception of the call is initiated. The set of authority data to be determined for the respective authority/interception case is fixed by authority database LIDB. The determination of authority data is thus performed by control unit CONTR according to the respective interception case.

Interception logics IL1 to IL3 are assigned to different interception cases and different authorities. Each interception logic corresponds to a different interception case. Based on different filter criteria or on different combined filter criteria, interception logics IL1 to IL3 determine in parallel whether a call should be intercepted or not.

The number of interception logics IL1 to IL3 has been chosen here by way of example.

The operation of interception logics IL1 to IL3 will now be described using interception logic IL1 as an example.

When interception manager LIM has been triggered for a call by control unit CONTR, interception logic IL1 monitors the communications traffic between the respective associated service switching point and the respective one or more associated service control points. Based on the information exchanged for the call between this service switching point and these one or more service control points and on pre-defined filter criteria, it then determines whether the call should be intercepted or not.

Filter criteria can be all information exchanged in a communication between service switching point and service control point, such as calling and called numbers, translated number, type of service provided, specific commands sent from the service control point to the service switching point or to other network elements (intelligent peripherals, network elements of an IP network), such as commands to initiate specific recorded announcements or to transfer specific status data or address information.

Filter criteria can also be generally available data such as the date and the time of day.

Filter data can also be based on data from databases that are associated with service control points. To determine these data, interception logic IL1 accesses the respective database, e.g., database CCDB, through communications control unit DM and extracts the data from this database. The filter criteria are then applied to the data so determined. It is thus determined whether the extracted data meet the filter criteria.

Example: The database is the database of a credit card service or phone card service. The credit card service is triggered for a call. Interception logic IL1 accesses the database assigned to this service, and determines on the basis of this access which subscriber is assigned to the credit card number being transported from the service switching point to the service control point. If this subscriber is a subscriber defined by a filter criterion, interception logic IL1 will initiate the interception of the call.

Another example: Interception logic IL1 accesses the number portability database of a number portability service through communications control unit DM.

It is, of course, possible to combine these filter criteria in arbitrary fashion and to base the decision as to whether a call should be intercepted or not on this combination.

One embodiment of the flow of messages in the method according to the invention will now be explained with reference to FIG. 3.

Figure 3:
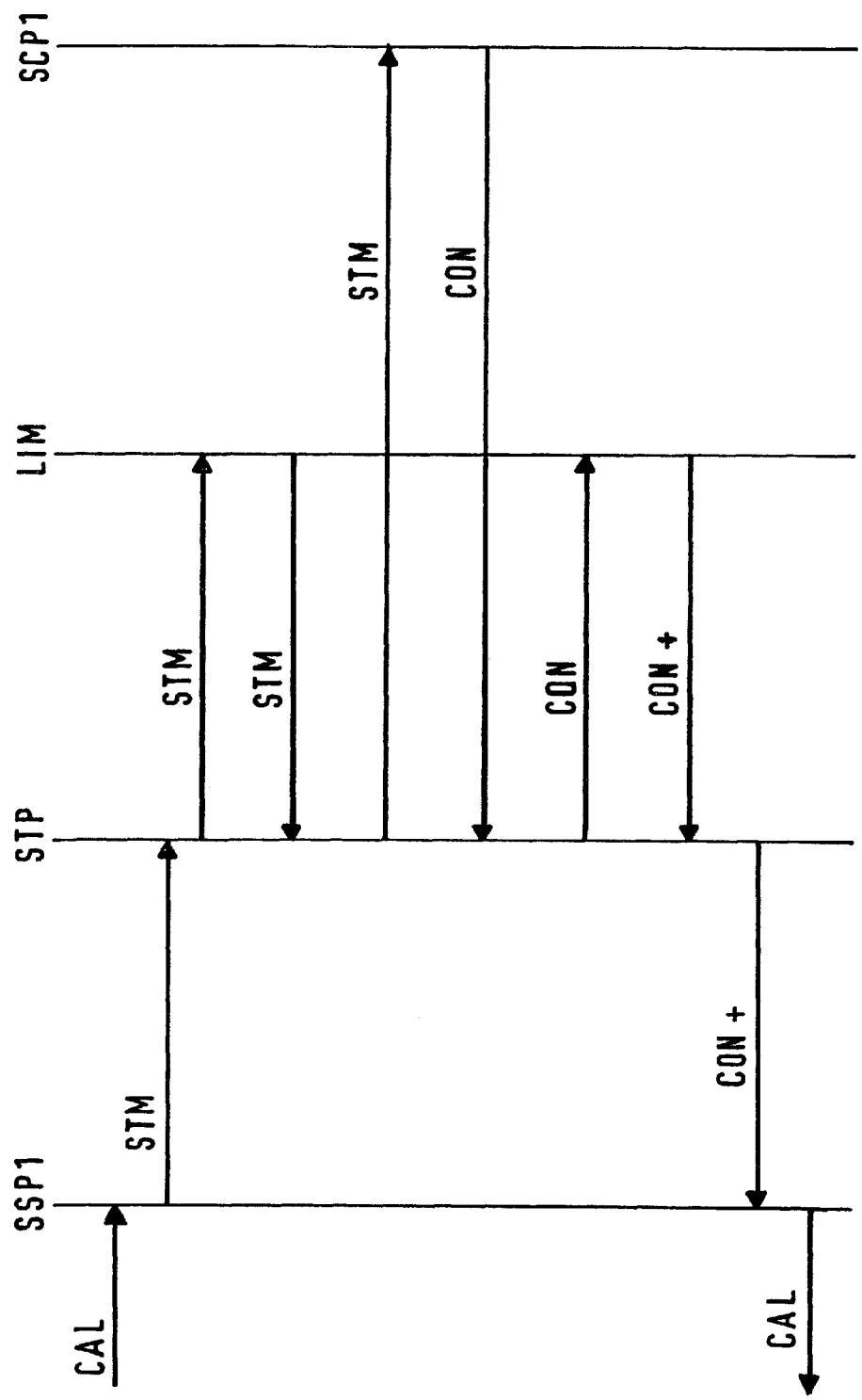
FIG. 3 is a diagram illustrating the flow of messages in the method according to the invention.

FIG. 3 shows the service switching point SSP1, a signaling node STP, the interception manager LIM, and the service control point SCP1. Service switching point SP1, interception manager LIM, and service control point SCP1 are of the same design as in FIG. 1. Signaling node STP is a conventional signaling node of a No. 7 Signaling System.

A call CAL is routed through communications network KOM to service switching point SSP1. The call meets a trigger criterion of service switching point SSP1, and a call request STM is sent by service switching point SSP1 through the signaling network to service control point SCP1. Signaling node STP reroutes the service request message STM to interception manager LIM. The arrival of the service request message STM triggers the interception manager for the call. Interception manager LIM extracts (copies) the information contained in the service request message STM, and forwards the service request message STM to service control point SCP1. Service control point SCP1 provides a service for the call and sends a corresponding control message CON through the signaling network to service switching point SSP1. Signaling node STP reroutes the control message CON to interception manager LIM. Interception manager LIM extracts (copies) the information contained in the control message CON. The information contained in the service request message STM and the information contained in the control message CON are compared with filter criteria, and the interception manager determines from the result of the comparison whether call should be intercepted or not. If the call should be intercepted, the interception manager will initiate the interception of the call by changing the control message CON. It sets a specific parameter in the control message and adds the authority data. It then sends the changed control message as a control message CON+ to service switching point SSP1. Upon receipt of the control message CON+, the service switching point sets up a conference connection to the authority and transfers the authority data to the latter in parallel. Furthermore, it transfers the call cal to service control point SCP1 according to the control instructions.

What is claimed is:

1. A method of intercepting calls between two or more subscribers of a communications network, wherein for each of the calls, at least one of a plurality of service control points can be triggered by a service switching point of the communications network, and wherein the service control points, when triggered for a call, control the provision of a service for the call, wherein:

the communications traffic between a plurality of service switching points of the communications network and the service control points is routed through an interception manager central to all service control points and decoupled from all service switching points, the central interception manager is triggered for a call when one of the service control points is triggered for this call by one of the service switching points, the central interception manager, when triggered for a call, monitors the communications traffic between the respective service switching point and the respective service control point for the respective call and, based on information exchanged between the respective service switching point and the respective service control point, and on predefined filter criteria, determines whether the call should be intercepted or not, and the central interception manager initiates the interception of the respective call if it determines that the call should be intercepted.

2. A method as claimed in claim 1, wherein the interception manager comprises two or more different interception logics, which determine in parallel based on different filter criteria whether a call should be intercepted or not.

3. A method as claimed in claim 2, wherein the two or more different interception logics are associated with different users.

4. A method as claimed in claim 1, wherein the interception manager additionally has access to a database associated with one of the service control points to determine whether a call should be intercepted or not.

5. A method as claimed in claim 1, wherein the interception manager has access to an authority database, and determines the respective authority data for a call when it determines that the call should be intercepted.

6. A method as claimed in claim 1, wherein the interception manager initiates the interception of the respective call by setting, in a signaling message sent by the respective service control point to the respective service switching point, a specific parameter which indicates to this service switching point that the call should be intercepted.

7. A method as claimed in claim 1, wherein the interception manager initiates the interception of the respective call by sending to the respective service switching point a signaling message which indicates to this service switching point that the call should be intercepted.

8. An interception manager for supporting the interception of calls between two or more subscribers of a communications network comprising:

a communications control unit for communication with service switching points of the communications network and for communication with a plurality of service control points, which each control the provision of one service for a call when triggered for one of the calls by one of the service switching points;

at least one interception logic designed to monitor the communications traffic between the respective service switching point and the respective service control point for a call when the interception manager is triggered for this call, and to determine on the basis of the information exchanged between the service switching point and the respective service control point, and on the basis of predefined filter criteria, whether the call should be intercepted or not;

a control unit designed to centrally trigger the interception manager for a call when one of the service control points is triggered for this call by one of the service switching points, and wherein the control unit is further designed to initiate the interception of the respective call when the at least one interception logic determines that the call should be intercepted;

wherein the communications traffic between a plurality of service switching points of the communications network and the service control points is routed through the interception manager, and wherein the interception manager is decoupled from all of the service switching points.

9. An interception manager as claimed in claim 8, wherein the interception manager forms part of an infrastructure Intelligent Network platform.

10. A service control platform for controlling services for calls in a communications network, comprising:

a plurality of service control points, which control the provision of a service for a call when triggered for the call by a service switching point of the communications network, a central interception manager for all service control points, which is connected to the one or more service control points, that the interception manager comprises:

a communications control unit for handling and controlling the communications traffic with service switching points of the communications network and with the service control points;

at least one interception logic designed to monitor the communications traffic between the respective service switching point and the respective service control point for a call when the interception manager is triggered for this call, and to determine on the basis of the information exchanged between the service switching point and the respective service control point, and on the basis of predefined filter criteria, whether the call should be intercepted or not;

a control unit designed to centrally trigger the interception manager for a call when one of the service control points is triggered for this call by one of the service switching points, and wherein the control unit is further designed to initiate the interception of the respective call when the at least one interception logic determines that the call should be intercepted;

wherein the communications traffic between a plurality of service switching points of the communications network and the service control points is routed through the interception manager, and wherein the interception manager is decoupled from all of the service switching points.

* * * * *